United States Patent [19]

Davis

[11] Patent Number: 5,254,667
[45] Date of Patent: Oct. 19, 1993

[54] MACROMERS FOR PREPARATION OF GRAFT POLYMER POLYOL DISPERSIONS

[75] Inventor: John E. Davis, Woodhaven, Mich.

[73] Assignee: BASF Corporation, Parsippany, N.J.

[21] Appl. No.: 377,080

[22] Filed: Jul. 10, 1989

[51] Int. Cl.$^5$ .................... C08F 261/06; C08F 283/06
[52] U.S. Cl. ...................................... 528/306; 525/298;
525/302; 525/309; 528/272; 528/300; 528/306
[58] Field of Search ............... 525/298, 302, 308, 309,
525/404, 408; 528/272, 300, 306

[56] References Cited

U.S. PATENT DOCUMENTS

| | | | |
|---|---|---|---|
| 3,905,943 | 9/1975 | Gormley | 528/303 |
| 3,951,888 | 4/1976 | Isayana et al. | 525/404 |
| 3,957,906 | 5/1976 | Buzbee et al. | 525/48 |
| 4,532,297 | 7/1985 | Gardner | 525/48 |
| 4,690,956 | 9/1987 | Ranlow et al. | 525/41 |

Primary Examiner—James J. Seidleck
Assistant Examiner—W. A. H. Clark
Attorney, Agent, or Firm—William G. Conger

[57] ABSTRACT

New macromers useful for the preparation of white, stable, high solids, low viscosity vinyl graft polymer polyol dispersions and processes for the manufacture of the macromers are disclosed.

4 Claims, No Drawings

MACROMERS FOR PREPARATION OF GRAFT POLYMER POLYOL DISPERSIONS

BACKGROUND OF THE INVENTION

1. Field of the Invention

The subject invention pertains to graft polymer polyols. More particularly, the subject invention pertains to new macromers suitable for the preparation of high solids, stable, low viscosity graft polymer polyol dispersions.

2. Description of the Related Art

A macromer is a polymer molecule with reactive functionality attached to it. The functionality allows the polymer to act as a high molecular weight monomer in another polymerization reaction. A common macromer strategy is to synthesize a polymer by polymerization of a monomer by one type of mechanism, and to include a small amount of a similar monomer. This second monomer has two reactive sites, one of which is capable of participating in the polymerization by the same mechanism. This second monomer also has a reactive site which is not capable of participating in the polymerization by the above mechanism, but is capable of reacting via a different mechanism.

An example of this might be a polymer made by condensation polymerization, e.g. a polyester. If one or more of the components of the polyester chain contain a group polymerizable a by free radical mechanism, e.g. an unsaturated dicarboxylic acid, then the polyester can serve as a monomer in a new polymer made by free radical polymerization. The use of unsaturated polyesters and styrene monomer to make fiberglass-reinforced plastics is well known.

A macromer is one of the key ingredients in the synthesis of graft polyols. It is a molecule with structure similar to the continuous phase of the product, i.e. a polyether or polyester polyol. In addition, it contains an unsaturated functionality which can undergo free radical polymerization with the vinylic monomers, to form the graft polymer. This graft polymer is the dispersion stabilizer which allows a stable graft polyol to be prepared. The resultant graft polyol is a stable dispersion of two incompatible materials. The part of the graft polymer which has structure similar to the acrylonitrile/styrene or other vinylic polymer dispersed phase associates with the copolymer, while the polyether component associates with the polyether continuous phase. The graft polymer is situated at the boundary between the two phases and ties them together.

Macromers, as herein defined, have been made since the late 60's and the synthesis and process for their manufacture is still basically the same: a polyether polyol or polyester polyol with hydroxyl termination is reacted under pressure with maleic anhydride and an excess of alkylene oxide. The maleic anhydride esterifies a hydroxyl group on the polyol, generating a carboxyl group in the process. The alkylene oxide can then react with the carboxyl group forming a hydroxyl-terminated ester, while at the same time, reducing the acid number of the macromer back to zero. The result is a polyether polyol with a site, the maleic acid moiety, capable of participating in the free radical-initiated polymerization of, for example, acrylonitrile and styrene. A typical process is disclosed in U.S. Pat. No. 3,953,393.

Over the years, as illustrated by U.S. Pat. No. 4,690,956, the basic synthesis has been changed to allow for an isomerization of maleate to fumarate to occur. Many base polyols have been used. A catalyst, generally a lipophilic calcium salt, has been used to promote the isomerization, lower the reaction temperature, and shorten the reaction time. But the same basic process, a "one step" batch-process in a pressure vessel, is still used today in production. Everything is charged in the beginning, the vessel sealed, and after reaction, the product is discharged. However, the reaction sequence is not just one step. There appear to be several competing reactions occurring, and as a result, the product is very sensitive to the conditions used to make it. This variability in the macromer from batch-to-batch has an effect of the quality of the graft polyols made with it.

Other macromers are known, which are used to make graft polyols, which do not use the maleate or fumarate moiety. An example is a macromer made by reacting a polyol with isocyantoethyl methacrylate. Macromers of this type are not storage-stable. They must be used immediately after synthesis or they soon increase in viscosity and become unusable.

It would be desirable to be able to prepare macromers containing ethylenic unsaturation in a more reproducible fashion, without the side reactions occurring during traditional macromer preparation. It would further be desirable to prepare macromers which are storage stable and which can be prepared in short cycle times without the use of a pressurized reactor.

SUMMARY OF THE INVENTION

A new process for making macromers which is simpler, which results in a better characterized product, and which can be made more reproducibly has now been developed. In addition to these advantages, macromers can be synthesized by this new process which would have been difficult, if not impossible, with conventional technology.

The key to this new process is the use of an alkylfumaryl halide to provide the induced unsaturation in the macromer. These reagents readily esterify the hydroxyl group of the polyol giving the desired fumarate ester. The amount of fumarate ester incorporated is simply a function of the stochiometric ratio of alkylfumaryl halide to equivalents of hydroxyl groups on the polyol. By the old method the maximum level of unsaturation is process limited, and the level measured by NMR is often much less than the theoretical, based on the charges. By using an alkylfumaryl halide, the amount of fumarate unsaturation found should be that which was charged. The ratio charged is limited only by the equivalents of hydroxyl available for esterification. The level of fumarate in the macromer should be low enough to minimize undesirable crosslinking reactions when the macromer is used in graft polyol synthesis.

DESCRIPTION OF THE PREFERRED EMBODIMENTS

The macromers of the subject invention are synthesized by the reaction of an alkylfumaryl halide or alkoxyalkylfumaryl halide with a polyol having hydroxyl functionality. the alkylfumaryl halide may be a bromide, chloride, or iodide. Because of their ease of preparation and lower cost, the alkyl- and alkoxyalkyl fumaryl chlorides are preferred.

The alkyl and alkoxyalkyl fumaryl chlorides may be prepared by the reaction of maleic anhydride in excess alkanol or alkoxyalkanol. The maleic anhydride is dissolved in the alkanol or alkoxyalkanol and a small amount of thionyl chloride or thionyl bromide added to promote esterification and rearrangement to the half ester of fumaric acid. The product is separated and purified by traditional methods.

Following preparation of the alkyl or alkoxyalkyl hydrogen fumarate, the acid moiety of the half ester is converted to the acid halide by traditional methods, for example, but not by limitation, by reaction with thionyl chloride, thionyl bromide, phosphorous trichloride, phosphorous oxychloride, or phosphorous tribromide. The product, when of low molecular weight, is preferably distilled under vacuum after stripping away any excess halogenating reagent.

The alkanols which may be reacted with the maleic anhydride include the lower $C_1$-$C_8$ alkanols, for example methanol, ethanol, propanol, isopropanol, 2-ethylhexanol, and octanol, and higher $C_9$-$C_{18}$ alkanols, for example the oxo alcohols containing from 9 to about 18 carbon atoms. Preferred is ethanol. Alkoxyalkanols useful include the preferred $C_2$-$C_4$ low molecular weight species such as methoxymethanol and methoxyethanol as well as oligomers prepared through the addition of alkylene oxides to an alkanol, for example the methanol, ethanol, or butanol initiated block, heteric, and block-heteric polyoxyethylene/polyoxypropylene polymers and copolymers. When the molecular weight of these species is appreciable, methods of purification other than vacuum distillation may have to be employed.

The polyols useful for reacting with the alkyl or alkoxyalkylfumaryl halide to form the subject invention macromer may be selected from any of the conventional hydroxyl functional polyols. Such polyols are well known to those skilled in the art. Especially preferred are polyols which are similar chemically to the polyol used as the dispersing medium for the subsequent graft polyol. For example, a polyether polyol "carrier polyol" or dispersing polyol for the graft polyol usually works best with a macromer based on a polyether polyol. The polyether polyols are preferred. Such polyether polyols are prepared by the base catalyzed oxyalkylation of a compound having one or more reactive hydrogen atoms. Preferred polyether polyols are prepared by oxyalkylating with ethylene oxide, propylene oxide, or their mixtures. The method of preparation of polyether polyols is well known in the art.

To synthesize the macromer, the alkyl or alkoxyalkylfumaryl halide is added to the polyol in a mole equivalent ratio of acid halide groups to hydroxyl groups of from 1:1000 to 1:1, preferably 10:1 to about 1:1. The addition is generally performed over a time period of from ten minutes to an hour, at room temperature in a suitable solvent, for example methylene chloride, following which the mixture is heated to 70°-80° C. for one hour. The acidic macromer thus formed is treated with magnesium silicate to remove the generated hydrogen halide, filtered, and stored. Due to the storage stability of the subject macromers, they may be stored for extended periods of time for later use.

Many variations of macromer synthesis are possible. For example, prior to reaction of polyol with alkyl or alkoxyalkylfumarylhalide, the polyol may be dimerized or chain extended to a higher molecular weight product through reaction with a diisocyanate, e.g. toluenediisocyanate or 4,4'-isocyanatodiphenylmethane. Instead of dimerizing the polyol prior to reaction, the alkyl or alkoxyalkylfumarate polyol monoester may be prepared following which dimerization with diisocyanate may be preformed. If a macromer having three unsaturation sites is desired, the alkyl- or alkoxyalkylfumarate polyol monoester may be dimerized with fumaric diacidchloride.

Synthesis of graft polymer polyols occurs by normal means, as disclosed in U.S. Pat. No. 3,953,393. From 0.1 to about 20 weight percent of macromer is used based on the change of the vinylic monomers. More preferably from 0.5 to 10 weight percent is utilized, and most preferably from 1 to about 5 weight percent. It is preferred to use a reaction moderator in the preparation of these graft polyols.

The subject invention will now be illustrated by several examples showing the preparation and use of an alkylfumaryl halide and a macromer prepared therefrom, and the use of the macromer to prepare a graft polymer polyol dispersion.

EXAMPLE 1

Synthesis of Ethyl Hydrogen Fumarate

Maleic anhydride (100.0 g, 1.02 mole) was dissolved in anhydrous ethanol (60 ml, excess) by heating the mixture in an erlenmeyer flask on a steam bath. Thionyl chloride (1.0 ml) was added using a syringe and the mixture heated with stirring for ten minutes. To the turbid mixture was added carbon tetrachloride (100 ml) and the liquid quickly filtered through a Buchner funnel having a coarse glass frit. The solid was discarded. The filtrate was allowed to cool during which the time the ethyl hydrogen fumarate product (92 g, 63%) crystallized.

EXAMPLE 2

Synthesis of Ethylfumaryl Chloride

To a 500 ml round bottom flask equipped with magnetic stirrer and reflux column was charged 100 g (0.69 mole) ethyl hydrogen fumarate. Thionyl chloride was added in excess (100 ml) and the mixture refluxed for two hours following which excess thionyl chloride was stripped and the crude product distilled. The fraction distilling between 70°-84° C. at 10 torr was collected, yielding 104 g (93%).

EXAMPLE 3

Synthesis of a Dimerized Polyol

A trimethylolpropane initiated polyoxypropylene polyether polyol having an approximately 5 weight percent polyoxyethylene cap and a hydroxyl number of 26.6 (200.0 g, 0.095 equivalents) was added to a four neck round bottom flask equipped with a nitrogen inlet, stirrer, reflux condenser, and thermometer. To the flask at room temperature was added 3.4 g (0.039 equivalents) of 2,4-toluenediisocyanate over a period of ten minutes while stirring. After 30 minutes, the flask was heated to 70°-80° C. where it was held for one hour. The product was cooled and discharged.

EXAMPLE 4

Macromer Preparation

To the reactor described in Example 3 was charged 203.4 (0.044 mole) of the product of Example 3. From a weighed syringe was charged dropwise over 15 minutes 7.12 g (0.44 mole) ethylfumaryl chloride. Following 30 minutes reaction of room temperature, the mixture was heated to 70°-80° C. where it was held while stirring for one hour. The acidic macromer was then treated with 6.3 g (excess) magnesium silicate to remove hydrogen chloride generated during the reaction. The product was filtered and stored. When the viscosity of the macromer is too high for efficient filtration, it may be diluted with methylene chloride, filtered, and stripped.

EXAMPLE 5

In a manner similar to Example 4, ethylfumaryl chloride was reacted with 200.0 grams of the polyol used to prepare the dimer polyol of Example 3. The product was less viscous then the product of Example 4 and could be more easily filtered after treatment with magnesium silicate. This product was then dimerized with 3.4 grams of 2,4-toluene diisocyfumaryl as in Example 3.

EXAMPLE 6

A monomeric macromer was prepared by reacting the polyether polyol of Example 3 (200.0 g) with 7.12 g ethylfumaryl chloride as in Example 4.

EXAMPLE 7

A macromer was prepared by the reaction, on a mole per mole basis, of ethylfumaryl chloride with a trimethylolpropane initiated block-heteric polyoxyalkylene polyether having approximately 75 weight percent polyoxyethylene and 25 percent polyoxypropylene content and a hydroxyl number of 7, which is water soluble and which has a high viscosity. Attempts to make a similar macromer using conventional methods did not succeed.

EXAMPLE 8

A "dimerized" macromer was prepared in accordance with Example 3 and 4. The polyol used was a glycerine initiated heteric polyoxyethylene-polyoxypropylene polyether polyol containing 25 weight percent polyoxyethylene content, 5 weight percent being present as a cap. The polyol hydroxyl number was 25.

EXAMPLE 9

Preparation of Graft Polymer Polyols

Graft polymer polyols were prepared by conventional methodology using the macromers of the subject invention. The reaction temperature was 125° C. and either bromotrichloromethane or dodecanethiol was used as the reaction moderator. The free radical polymerization initiator was 2,2'-azobis[2-methylbutyronitrile]. Results are summarized in Table 1. Catalyst and reaction moderator weight percents are based on the vinylic monomer charge. The comparative macromer is derived from the same type polyol as the undimerized polyol of Example 3 reacted with maleic anhydride, isomerized to fumarate, and reacted with ethylene oxide as described on pages 3 and 4 of the subject application.

TABLE I

| Macromer, %[1] | Acrylonitrile/ Styrene | | Reaction Moderator Type % | Catalyst, %[2] | Product Viscosity, cP |
|---|---|---|---|---|---|
| | Ratio | % Solids | | | |
| Comparative, 3.75% | 1:2 | 40% | DDSH, 1% | 0.625% | 4460 |
| Example 4, 3.75% | 1:2 | 40% | DDSH, 1% | 0.625% | 5310 |
| Example 5, 3.75% | 1:2 | 40% | DDSH, 1% | 0.625% | 4740 |
| Example 7, 12.67% | 2:1 | 50% | BTCM, 1% | 1.8% | 91,000 |
| Example 8, 16% | 2:1 | 50% | BCTM, 2% | 0.625% | 4890 |
| Example 8, 12.7% | 2:1 | 40% | BCTM, 1% | 1.8% | 4480 |

[1]DDSH is dodecanethiol; BTCM is bromotrichloromethane.
[2]Catalyst 2,2'-azobis(2-methylbutanenitrile)

I claim:

1. An alkylfumarate-group-containing macromer suitable for use in preparing vinyl graft polymer polyether polyol dispersions comprising the reaction product of an alkylfumaryl halide and a polyether polyol.

2. The macromer of claim 1 wherein said alkyl group contains from 1 to about 18 carbon atoms.

3. The macromer of claim 2 wherein said alkyl group contains from 1 to about 8 carbon atoms.

4. The macromer of claim 3 wherein said alkyl group is an ethyl group.

* * * * *